US009110276B2

(12) United States Patent
Cook

(10) Patent No.: US 9,110,276 B2
(45) Date of Patent: Aug. 18, 2015

(54) FULL-FIELD GEO IMAGER OPTICS WITH EXTENDED SPECTRAL COVERAGE

(75) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 709 days.

(21) Appl. No.: 13/354,415

(22) Filed: Jan. 20, 2012

(65) Prior Publication Data

US 2013/0187047 A1    Jul. 25, 2013

(51) Int. Cl.
  *G02B 13/14*   (2006.01)
  *G02B 27/10*   (2006.01)
  *G02B 9/60*    (2006.01)

(52) U.S. Cl.
  CPC ............... *G02B 13/146* (2013.01); *G02B 9/60* (2013.01); *G02B 27/1013* (2013.01)

(58) Field of Classification Search
  CPC ...... G02B 9/60; G02B 13/14; G02B 27/1013; G02B 13/146; G01J 5/0806
  USPC ............... 250/330, 338.1, 353; 356/300, 326; 359/357, 363, 763
  See application file for complete search history.

(56) References Cited

U.S. PATENT DOCUMENTS

| | | | |
|---|---|---|---|
| 4,507,551 A | 3/1985 | Howard et al. | |
| 4,679,891 A | 7/1987 | Roberts | |
| 5,692,062 A | 11/1997 | Lareau et al. | |
| 5,742,251 A | 4/1998 | Gerber | |
| 5,940,224 A | 8/1999 | Zhang | |
| 6,091,551 A | 7/2000 | Watanabe | |
| 6,130,705 A | 10/2000 | Lareau et al. | |
| 6,424,460 B1 | 7/2002 | Kirkham | |
| 6,781,127 B1 * | 8/2004 | Wolff et al. | .................... 250/332 |
| 6,989,537 B2 | 1/2006 | Cook | |
| 7,012,759 B2 | 3/2006 | Betensky et al. | |
| 7,092,150 B1 | 8/2006 | Cox | |
| 7,138,619 B1 | 11/2006 | Ferrante et al. | |
| 7,218,444 B2 * | 5/2007 | Cook | ............................ 359/353 |

(Continued)

FOREIGN PATENT DOCUMENTS

| | | |
|---|---|---|
| EP | 490510 A2 | 6/1992 |
| EP | 1355180 A2 | 10/2003 |

(Continued)

OTHER PUBLICATIONS

Potter, Ned, "Hobbyist Shoots Earth From Edge of Space with Used Camera from Ebay", http://abcnews.go.com/Technology/balloon-camera-duct-tape-shoot-earth-pictures-space/story?id=10210658, Mar. 26, 2010.

(Continued)

*Primary Examiner* — David Porta
*Assistant Examiner* — Carolyn Igyarto
(74) *Attorney, Agent, or Firm* — Lando & Anastasi, LLP

(57) ABSTRACT

A wide field-of-view infrared optical imaging system with extended spectral coverage into the 1.0 to 2.5 µm wavelength range. In one example, an optical imaging system includes an imaging detector sensitive to light in a wavelength range of at least 1.0 µm to 5.0 µm, and a plurality of lenses optically coupled together and configured to focus incoming light onto the imaging detector, the plurality of lenses each comprised of a material that is transparent to the light in the wavelength range of at least 1.0 µm to 5.0 µm, wherein a pupil of the optical imaging system is located external to the plurality of lenses between the plurality of lenses and the imaging detector.

11 Claims, 3 Drawing Sheets

(56) References Cited

U.S. PATENT DOCUMENTS

| | | |
|---|---|---|
| RE40,582 E | 11/2008 | Ishii et al. |
| 8,294,988 B2* | 10/2012 | Cook ............................ 359/557 |
| 2004/0169933 A1 | 9/2004 | Toyama |
| 2005/0243411 A1 | 11/2005 | Cook |
| 2005/0259330 A1 | 11/2005 | Neil |
| 2007/0023663 A1* | 2/2007 | Chen et al. ............... 250/339.02 |
| 2008/0106798 A1 | 5/2008 | Sato |
| 2009/0109546 A1 | 4/2009 | Watanabe et al. |
| 2009/0168193 A1 | 7/2009 | Suzaki et al. |
| 2009/0212219 A1* | 8/2009 | Cook ............................ 250/351 |
| 2009/0316277 A1 | 12/2009 | Ichikawa |
| 2010/0033578 A1 | 2/2010 | Forestier et al. |
| 2010/0177195 A1 | 7/2010 | Colentier et al. |
| 2011/0279681 A1* | 11/2011 | Cabib et al. ................... 348/164 |
| 2012/0176668 A1* | 7/2012 | Saito et al. .................... 359/357 |
| 2012/0229914 A1 | 9/2012 | Cook |

FOREIGN PATENT DOCUMENTS

| | | |
|---|---|---|
| EP | 2498115 A2 | 9/2012 |
| JP | 2002014283 A | 1/2002 |
| WO | 2012066431 A1 | 5/2012 |

OTHER PUBLICATIONS

Gross, Herbert et al, "Best Location for an Asphere Inside a System", in: Handbook for Optical Systems, Wiley-VCH, Weinheim, vol. 3, Jan. 1, 2007, p. 444.

* cited by examiner

FULL-FIELD GEO IMAGER OPTICS WITH EXTENDED SPECTRAL COVERAGE

BACKGROUND

Wide field-of-view (WFOV) infrared imaging systems are used in a variety of applications, such as on an unmanned aerial vehicle (UAV) platform for target recognition or on satellites, such as satellites of geostationary or geo-synchronous earth orbit (GEO). Wide area surveillance may be performed are various wavelength ranges depending on the application. For example, infrared optical systems from GEO are used for missile warning applications. Wavelength ranges of interest include the short wavelength infrared (SWIR) band in the wavelength range between about 1.4 micrometer ($\mu$m) and 3 the mid wavelength infrared (MWIR) band in the wavelength range between approximately 3 $\mu$m and 8 $\mu$m, and the long wavelength infrared (LWIR) band in the wavelength range between approximately 8 $\mu$m and 12 $\mu$m.

SUMMARY OF INVENTION

Conventionally, full-field sensor optics on geo-synchronous platforms have covered only the SWIR and infrequently the MWIR spectral bands for missile warning applications. Aspects and embodiments are directed to a multi-function WFOV optical imaging system with extended spectral coverage. In particular, certain aspects are directed to extending embodiments of the full-field geo-synchronous imager optical form to cover additional spectral bands, for example, the spectral region from about 1.0 $\mu$m to 5.0 to allow residual sensing functions in the "reflective" solar region. According to one embodiment, a multi-function optical system is configured to provide both traditional missile warning functions in the SWIR and MWIR spectral bands and additional sensing capability for other applications, for example, "see-to-the-ground," or weather (e.g., cloud-cover and storm progress) imagery, in approximately the 1.0-2.5 $\mu$m spectral band, as discussed further below.

According to one embodiment, an optical imaging system comprises an imaging detector sensitive to light in a wavelength range of at least 1.0 $\mu$m to 5.0 and a plurality of lenses optically coupled together and configured to focus incoming light onto the imaging detector, the plurality of lenses each comprised of a material that is transparent to the light in the wavelength range of at least 1.0 $\mu$m to 5.0 $\mu$m, wherein a pupil of the optical imaging system is located external to the plurality of lenses between the plurality of lenses and the imaging detector.

In one example of the optical imaging system, the plurality of lenses includes a first lens and a second lens located behind the first lens, the first lens having a positive power and being made from clear transparent zinc sulfide. The second lens may have a negative power and may be made from magnesium fluoride, for example. The plurality of lenses may further include a third lens positioned between the second lens and the pupil, the third lens having a negative power and being made of Amtir1, for example. In another example, the plurality of lenses further includes a fourth lens positioned between the third lens and the pupil, the fourth lens having a negative power and being made from barium fluoride. In another example, the plurality of lenses further includes a fifth lens positioned between the fourth lens and the pupil, the fifth lens having a positive power and being made from clear transparent zinc sulfide. The plurality of lenses may be configured and arranged to provide the optical imaging system with a field of view of approximately 18 to 20 degrees.

According to another example, the optical imaging system further comprises an aspheric corrector optically coupled between the plurality of lenses and the imaging detector and configured to correct for aspheric aberrations of the plurality of lenses over the wavelength range of at least 1.0 $\mu$m to 5.0 $\mu$m. In one example, the aspheric corrector is a Schmidt corrector plate. The aspheric corrector may be made from Amtir1, for example. In one example, the imaging detector is a two-dimensional focal plane array. The imaging system may further comprise a cryogenic dewar, wherein the imaging detector is located within the cryogenic dewar. The system may further comprise an aperture stop positioned at the pupil of the optical imaging system and located within the cryogenic dewar. In one example, the system further comprises at least one spectral filter disposed between the plurality of lenses and the imaging detector. In another example, the system further comprises a beamsplitter positioned between the plurality of lenses and the imaging detector and configured to split the incoming light into at least two wavebands. In one example, the at least two wavebands include a first waveband and a second waveband, and the imaging detector includes a first detector configured for the first waveband and a second detector configured for the second waveband. In another example, the at least two wavebands include a first waveband and a second waveband, and the imaging detector includes a first region sensitive to light in the first waveband and a second region sensitive to light in the second waveband. The first waveband may include a range of wavelengths from approximately 1.0 to 2.5 $\mu$m, for example, and the second waveband may include at least one of the short wavelength infrared spectral band and the medium wavelength infrared spectral band, for example.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to multi-function optical imaging systems capable of imaging over at least the spectral band from approximately 1.0 micrometers (μm) to about 5 μm. According to one embodiment, the ability to image in the 1.0 to 2.5 μm band, in addition to any or all of the SWIR and MWIR bands allows the system to provide both traditional missile warning functions, or other functions using infrared imaging, as well as additional sensing capability for other applications, such as providing weather information for example, at high spatial resolution and rapid frame times. Conventionally, these disparate sensing functions have been provided by entirely separate imaging systems each configured for the associated spectral band only.

Figure 1:
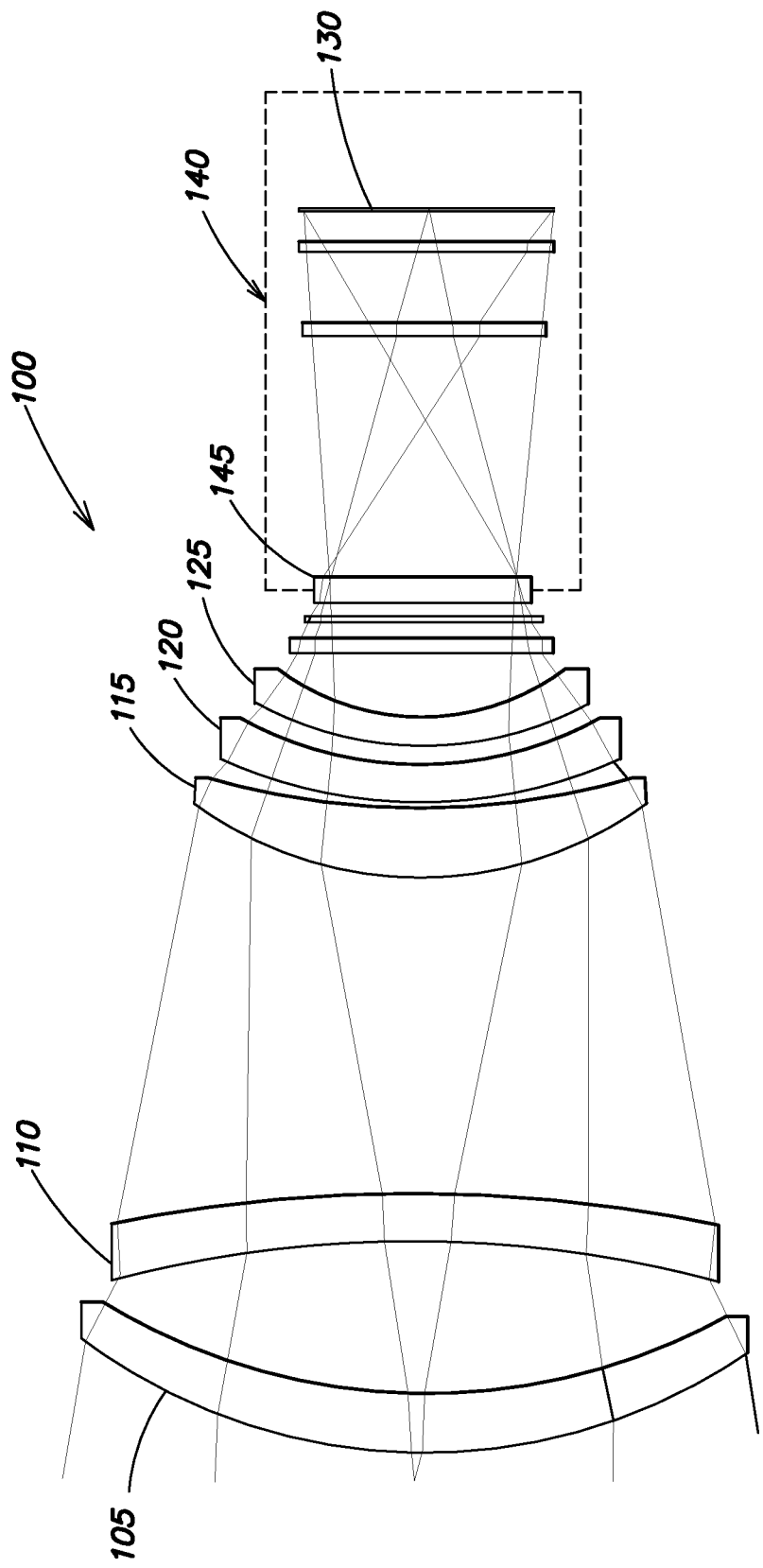
FIG. 1 is a ray trace of one example of an infrared optical imaging system for missile warning applications.

Referring to FIG. 1 there is illustrated one example of an infrared optical imaging system, such as may be used in missile warning systems. The optical imaging system 100 is typically located on a GEO platform and includes optics through which the optical path from a viewed scene (for example, coving an entire earth hemisphere) passes to reach an imaging sensor. The optical system 100 includes a plurality of lenses, 105, 110, 115, 120 and 125 configured to provide a desired focal length and field of view of the scene, and to focus the image the region of earth onto an infrared detector 130, such as a two-dimensional focal plane array. The detector 130 is housed within a dewar 140 that serves as a cold shield within which the detector 130 is cooled, for example, to cryogenic temperatures. The dewar 140 is provided with a window 145 selected to be transparent to infrared radiation within the desired wavelength range of operation of the system 100. For typical missile warning applications in the SWIR or MWIR spectral bands, the first lens 105 is made from silicon, and the second lens 110 is made from germanium. The third lens 115 is made from zinc selenide (ZnSe), the fourth lens 120 is made from gallium arsenide (GaAs), and the fifth lens 125 is made from barium fluoride (BaF2).

These materials provide an optical system 100 capable of providing images with high spatial resolution and rapid frame times in the high SWIR and MWIR spectral bands. However, the spectral coverage of the system is limited because several of the materials used for the optics are not transparent to light with wavelengths shorter than the mid-SWIR band. For example, silicon, germanium and gallium arsenide all are not transparent at wavelengths of about 1.0 μm. Silicon (the material of the first lens 105) is not transparent to wavelengths below approximately 1.1 μm. Similarly, germanium (the material of the second lens 110) is not transparent to wavelengths shorter than approximately 2 μm. Gallium arsenide (the material of lens 120) is also not transparent below approximately 2 μm.

According to one embodiment, an optical system is provided in which the lens materials and arrangement of the optical elements are selected and configured such that the system is capable of imaging in the wavelength range below 2 μm in addition to the SWIR and MWIR bands, for example, in the wavelength range of about 1-5 μm. As discussed above, this capability may allow the system to perform a variety of functions, including, for example, both missile warning functions and weather imaging functions. Certain embodiments are based on a rear-stopped WFOV refractive optical form, as discussed further below. The materials and arrangement of the optical elements are selected not only for transmission in the extended infrared spectral bands, as discussed above, but also to provide good image quality over the extended range.

Figure 2:
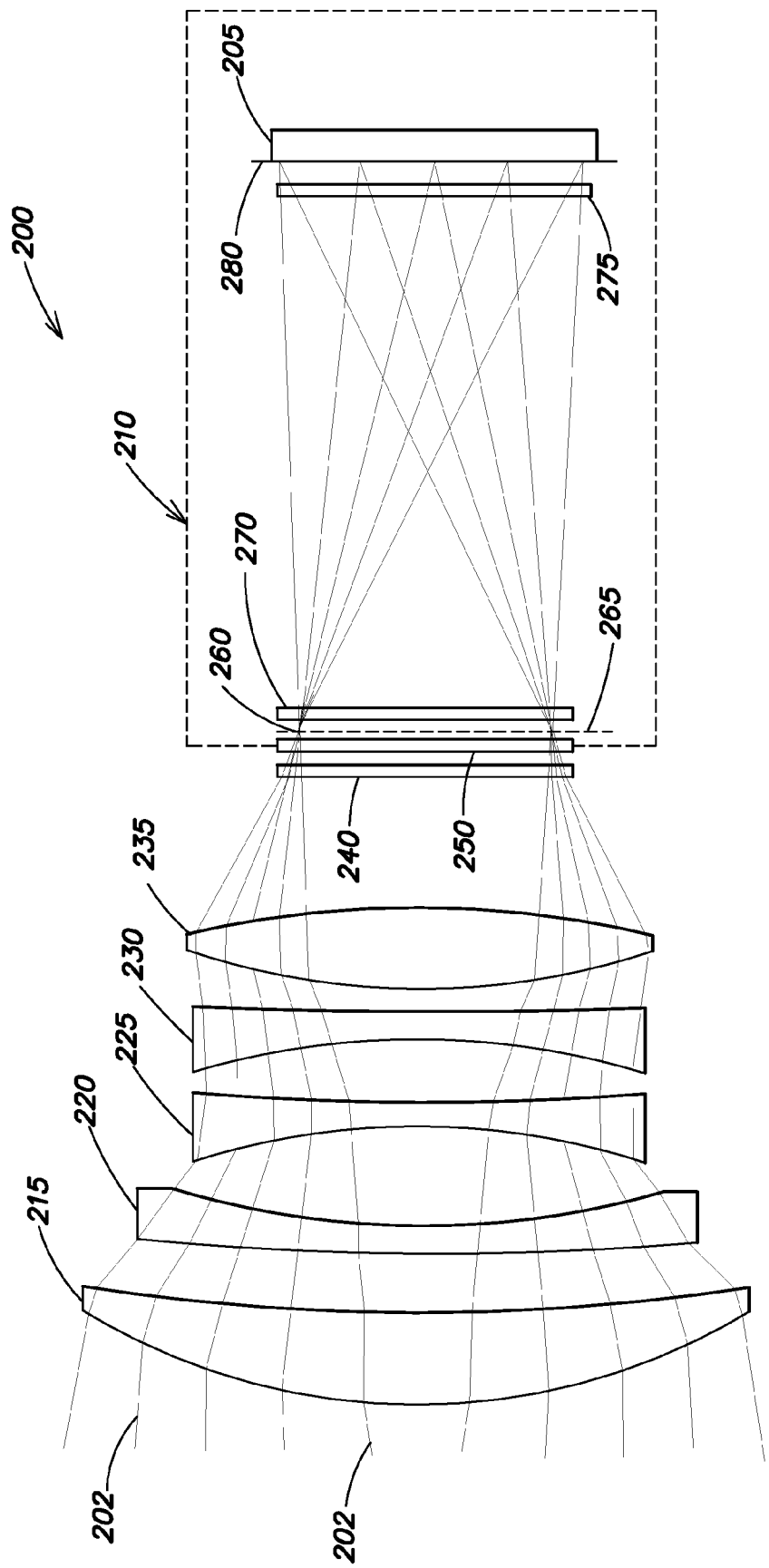
FIG. 2 is a ray trace of one example of an optical imaging system with extended spectral coverage according to aspects of the invention.

Referring to FIG. 2 there is illustrated an example of an extended spectral coverage optical imaging system according to one embodiment. Similar to system 100, the imaging system 200 may be located on a GEO platform and includes optics through which light rays 202 from a viewed scene pass to reach an imaging sensor or detector 205. The imaging system 200 includes an arrangement of lenses that capture light rays 202 from a far-field object and focus the incoming light rays 202 onto the detector 205. The detector 205 is therefore located at a focus or focal plane 280 of the imaging system 200. In the illustrated example, the imaging system 200 includes a first lens 215, a second lens 220, a third lens 225, a fourth lens 230 and a fifth lens 235. In one example, the lenses 215-235 are configured to provide the imaging system 200 with a WFOV, for example, a circular field of view between about 18 degrees and 20 degrees. The imaging system 200 may further include an aspheric corrector 240, for example, a Schmidt-type corrector plate, to correct for aspheric aberrations in the lenses 215-235.

In one example, the detector 205 is a two-dimensional focal plane array FPA). The FPA may be a large formal FPA, for example, a 4,000 by 4,000 pixel (known as a 4K×4K FPA) array having 20 μm pixels. In certain examples the detector 205 is sensitive to light in the infrared wavelength range, for example, from about 1 μm to about 5 μm. As discussed above the detector 205 may be cooled, for example, cryogenically cooled, during operation of the imaging system 200. Accordingly, the imaging system 200 may include a cold dewar 210 that houses the detector 205 and acts as a cold shield within which the detector 205 is cooled. As discussed above with reference to FIG. 1, the dewar 210 is provided with a window 250 selected to be transparent to infrared radiation within the desired wavelength range of operation of the system 200. In one example, an exit pupil 260 of the imaging system 200 is located external to the group of lenses 215-235. This configuration may be advantageous in that with an external pupil, none of the lenses 215-235 need be located within the dewar 210. In one example, a cold aperture stop 265 is provided at the external pupil 260, which may be inside the dewar 210, as shown in FIG. 2. In this manner the detector 205 is prevented from seeing radiation from the lens surfaces or other optical components that are warm (that is, not cold shielded by the dewar 210) and therefore may have high emissivity. One or more spectral filters 270, 275 may be provided within the dewar 210 and used for wavelength selection.

As discussed above, in conventional infrared optical imaging systems at least some of the lenses are typically made from a material that is not transparent, or which is only poorly transparent, to wavelengths in the 1 μm to 2 μm or 2.5 μm range. In contrast, according to one embodiment, all lenses 215-235 are made from materials that transmit effectively at wavelengths in the 1 μm to 2.5 μm range, without sacrificing performance in the upper SWIR range and MWIR range. In one embodiment, the first lens 215 is made from zinc sulfide (ZnS) or clear transparent zinc sulfide (ClZnS), and the second lens 220 is made from magnesium fluoride (MgF2), for example. In the example illustrated in FIG. 2, the first lens 215 has positive optical power and the second lens 220 has negative power. In one example, the third lens 225 and the fourth lens 230 both have negative power. The third lens may be made from Amtir1, for example, and the fourth lens 230 may be made from barium fluoride (BaF2), for example. The fifth lens 235 may have positive power and may be made from zinc sulfide, for example. These materials may be selected to provide the optical imaging system 200 with broadband spectral coverage, as discussed above.

Table 1 provides an optical prescription for an example optical system 200 corresponding to the ray trace illustrated in FIG. 2. The optical prescription for this example of the optical system 200 may be generated using an equation which is an industry standard and which would be known to those skilled in the art. It is to be appreciated however, that the prescription given in Table 1 is merely exemplary, and that the prescriptions of various embodiments of the optical system 200 are determined by the intended imaging task to be performed by the optical system. The units in Table 1 are in centimeters (cm).

TABLE 1

| Surface | Component | Rd | CC | Ad | Ae | Af | Ag | T | Material |
|---|---|---|---|---|---|---|---|---|---|
| 1 | Lens 215 | 16.724 | 0.06389 | 4.589E−06 | −1.847E−08 | 5.137E−10 | −2.292E−13 | 2.724 | ClZnS |
| 2 | | 60.369 | | | | | | 1.419 | air |
| 3 | Lens 220 | 69.672 | | | | | | 0.750 | MgF2 |
| 4 | | 23.511 | | 1.650E−05 | −8.330E−07 | 1.463E−08 | −4.304E−11 | 2.654 | air |
| 5 | Lens 225 | −17.761 | | 1.133E−04 | 7.573E−08 | −3.196E−09 | −3.809E−11 | 0.700 | Amtir1 |
| 6 | | 58.581 | | | | | | 1.707 | air |
| 7 | Lens 230 | −26.138 | | −1.014E−04 | −1.423E−06 | 3.429E−08 | −6.729E−12 | 0.700 | BaF2 |
| 8 | | 84.042 | | | | | | 0.696 | air |
| 9 | Lens 235 | 21.366 | | | | | | 2.043 | ClZnS |
| 10 | | −25.694 | | 6.655E−05 | −2.588E−07 | 5.463E−09 | −3.686E−11 | 3.541 | air |
| 11 | Corrector 240 | inf | | | | | | 0.334 | Amtir1 |
| 12 | | inf | | 5.423E−05 | 6.284E−07 | 5.962E−09 | −2.388E−10 | 0.350 | air |
| 13 | Window 250 | inf | | | | | | 0.334 | Amtir1 |
| 14 | | inf | | | | | | 0.334 | air |
| 15 | Stop 260 | inf | | | | | | 0.334 | air |
| 16 | Filter 270 | inf | | | | | | 0.334 | Amtir1 |
| 17 | | inf | | | | | | 13.66 | air |
| 18 | Filter 275 | inf | | | | | | 0.334 | Amtir1 |
| 19 | Focus 280 | inf | | | | | | 0.618 | air |

In Table 1, CC is conic constant, Rd is radius, T is thickness, and Ad, Ae, Af and Ag are aspheric constants. With the optical prescription given in Table 1, the corresponding example of optical system 200 illustrated in FIG. 2 achieves an F-number or speed of about F/2.20 with a focal length of about 25.41 cm, a field of view (FOV) of about 18.4 degrees, and a spectral coverage of 1.1 to 4.5 µm. In this example, the aperture diameter is about 11.54 cm and the stop 250 has a diameter of about 6.76 cm.

Figure 3:
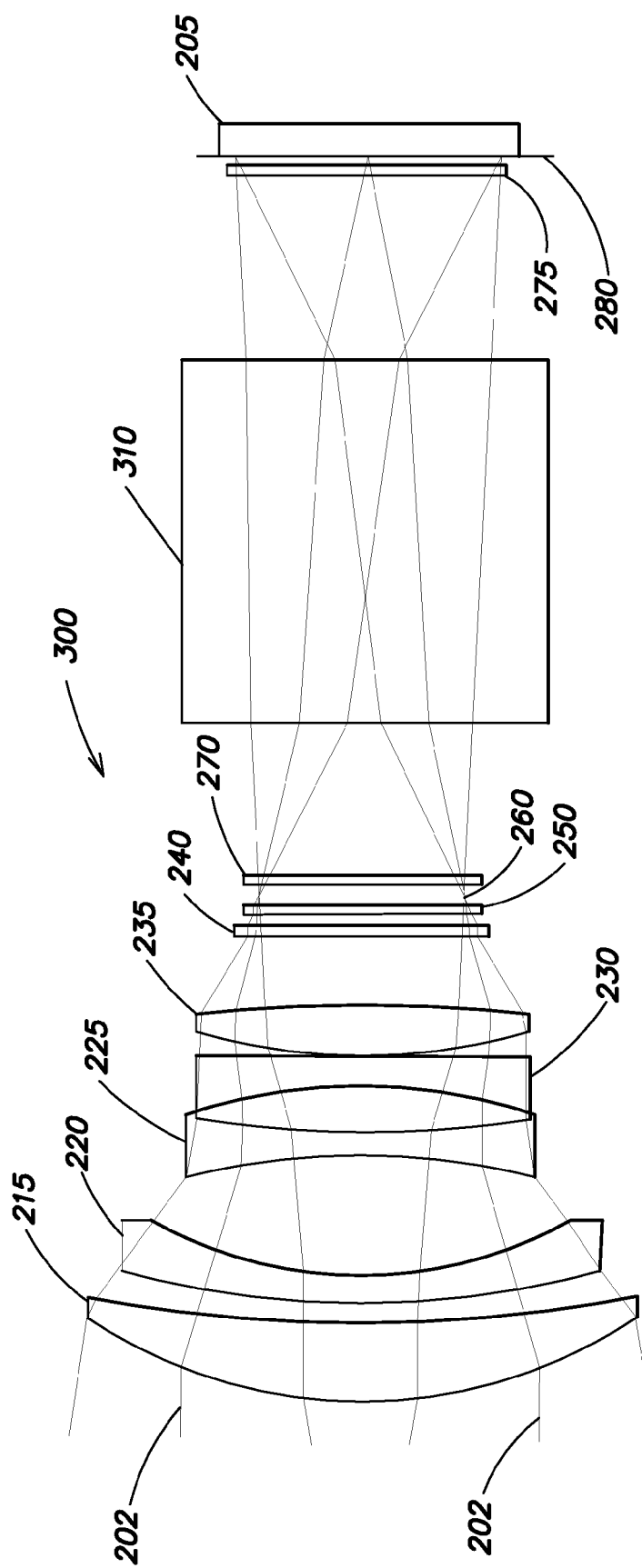
FIG. 3 is a ray trace of another example of an optical imaging system with extended spectral coverage according to aspects of the invention.

As discussed above, one or more filters 270, 275 may be used in the optical imaging system 200 for wavelength selection. In some applications, the system may be used to take an image in one spectral band, for example, SWIR, and then one or more of the filters 270, 275 may be changed to allow the system 200 to take an image in a different wavelength band, for example, MWIR. In other applications it may be desirable to provide the ability to image in multiple spectral bands simultaneously. Accordingly, referring to FIG. 3, in one embodiment, an optical imaging system 300 includes a cube-type beamsplitter 310 that may direct the incoming light rays 202 to two or more different focal planes or detectors simultaneously. In the example illustrated in FIG. 3, the beamsplitter 310 is a cube beamsplitter and may be a dichroic or spectral beamsplitter, for example. In one example the beamsplitter 310 is made from silicon.

The beamsplitter 310 may be used to separate the incoming light rays 202 into different spectral bands, and direct the different wavebands to corresponding detectors. In one example, the detector 205 may include two or more separate detectors that may be located on different focal planes, each configured to receive a particular waveband from the beamsplitter 310. In another example, the detector 205 may be segmented or divided into different regions, each region configured for a particular waveband from the beamsplitter 310. For example, the optical system 300 may be configured with one detector or region of detector 205 sensitive in the 1.0-2.5 µm band and SWIR band, and another detector or region sensitive in the MWIR. The beamsplitter 310 may therefore be configured to split the incoming light rays 202 between the 1.0-2.5 µm and SWIR bands, and the MWIR to direct the appropriate wavebands to the appropriate detectors. In another example, optical system 300 may be configured with one detector or region of detector 205 sensitive in the 1.0-2.5 µm band, and another detector or region sensitive in the SWIR and/or MWIR band(s). The beamsplitter 310 may be configured to appropriately split and direct the incoming light rays 202.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Thus, embodiments of the apparatuses discussed herein are not limited in application to the details of construction and the arrangement of components set forth in the description or illustrated in the accompanying drawings. Examples of specific implementations are provided herein for illustrative purposes only and are not intended to be limiting. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. Accordingly, the foregoing description and drawings are by way of example only, and the scope of the invention should be determined from proper construction of the appended claims, and their equivalents.

What is claimed is:
1. An optical imaging system comprising:
   an imaging detector including a first region sensitive to light in a first waveband including a range of wavelengths from approximately 1.0-2.5 µm, and a second region sensitive to light in a second waveband including at least one of the short wavelength infrared spectral band and the medium wavelength infrared spectral band, wherein the imaging detector is a two dimensional focal plane array;

a plurality of lenses optically coupled together and configured to focus incoming light onto the imaging detector, the plurality of lenses each comprised of a material that is transparent to the light in a wavelength range of at least 1.0 µm to 5.0 µm; and a beamsplitter positioned between the plurality of lenses and the imaging detector and configured to split the incoming light into at least the first waveband and the second waveband, and to direct the first waveband to the first region of the imaging detector and the second waveband to the second region of the imaging detector;

wherein a pupil of the optical imaging system is located external to the plurality of lenses between the plurality of lenses and the imaging detector.

2. The optical imaging system of claim 1, wherein the plurality of lenses includes a first lens and a second lens located behind the first lens, the first lens having a positive power and being made from clear transparent zinc sulfide.

3. The optical imaging system of claim 2, wherein the second lens has a negative power and is made from magnesium fluoride.

4. The optical imaging system of claim 3, wherein the plurality of lenses further includes a third lens positioned between the second lens and the pupil, the third lens having a negative power and being made of Amtirl.

5. The optical imaging system of claim 4, wherein the plurality of lenses further includes a fourth lens positioned between the third lens and the pupil, the fourth lens having a negative power and being made from barium fluoride.

6. The optical imaging system of claim 5, wherein the plurality of lenses further includes a fifth lens positioned between the fourth lens and the pupil, the fifth lens having a positive power and being made from clear transparent zinc sulfide.

7. The optical imaging system of claim 6, wherein the plurality of lenses are configured and arranged to provide the optical imaging system with a field of view of approximately 18 to 20 degrees.

8. The optical imaging system of claim 1, further comprising an aspheric-shaped corrector optically coupled between the plurality of lenses and the imaging detector and configured to correct for aberrations of the plurality of lenses over the wavelength range of at least 1.0 µm to 5.0 µm.

9. The optical imaging system of claim 8, wherein the aspheric-shaped corrector is a Schmidt corrector plate.

10. The optical imaging system of claim 8, wherein the aspheric-shaped corrector is made from Amtirl.

11. The optical imaging system of claim 1, further comprising at least one spectral filter disposed between the plurality of lenses and the imaging detector.

* * * * *